US011905161B1

(12) United States Patent
Theis

(10) Patent No.: US 11,905,161 B1
(45) Date of Patent: Feb. 20, 2024

(54) FORM-CODED UNDERGROUND STORAGE TANK FILLING PORT

(71) Applicants: Jason S. Theis, Gardena, CA (US); Zorawar Singh, Carson, CA (US)

(72) Inventor: Jason S. Theis, Gardena, CA (US)

( * ) Notice: Subject to any disclaimer, the term of this patent is extended or adjusted under 35 U.S.C. 154(b) by 0 days.

(21) Appl. No.: 17/900,641

(22) Filed: Aug. 31, 2022

(51) Int. Cl.

| | |
|---|---|
| ***B67D 7/32*** | (2010.01) |
| ***B67D 7/78*** | (2010.01) |
| ***B65D 88/76*** | (2006.01) |
| ***B65D 90/54*** | (2006.01) |
| ***B65D 90/51*** | (2019.01) |

(52) U.S. Cl.
CPC ........... *B67D 7/3209* (2013.01); *B65D 88/76* (2013.01); *B65D 90/51* (2019.02); *B65D 90/54* (2013.01); *B67D 7/3281* (2013.01); *B67D 7/78* (2013.01); *B65D 2588/54* (2013.01); *B65D 2590/24* (2013.01)

(58) Field of Classification Search
CPC .... B67D 2007/329; B67D 7/344; B67D 7/04; B67D 7/3209; B67D 7/22; B67D 7/32; F16L 2201/60; B65D 90/105
See application file for complete search history.

(56) References Cited

U.S. PATENT DOCUMENTS

| | | | | |
|---|---|---|---|---|
| 4,506,529 A * | 3/1985 | Armbruster, Jr. | F16L 35/00 | 70/168 |
| 6,886,577 B1 * | 5/2005 | Phillips | E02D 29/14 | 137/364 |
| 7,160,050 B2 * | 1/2007 | Meyers | E02D 29/1427 | 404/25 |
| 8,622,097 B2 * | 1/2014 | Kane | E02D 29/1409 | 141/311 A |
| 8,632,103 B2 * | 1/2014 | Fahie | F16L 37/18 | 285/80 |
| 9,969,604 B2 * | 5/2018 | Koeninger | B67D 7/04 | |
| 11,059,715 B2 * | 7/2021 | Fehr | G07F 15/001 | |
| 2015/0186837 A1 * | 7/2015 | Bianco | G06Q 10/087 | 235/381 |

FOREIGN PATENT DOCUMENTS

AU 2021218079 A1 * 3/2022

OTHER PUBLICATIONS

OPW, "Product Catalog, Retail & Commercial Fueling Products", Jan. 2021 (Year: 2021).*

* cited by examiner

*Primary Examiner* — Timothy P. Kelly
(74) *Attorney, Agent, or Firm* — Alexander R. Schlee; Pascal A. Schlee; Schlee IP International, PC

(57) ABSTRACT

A form-coded collar assembly that is configured to be attached around a filling pipe extending into an underground fuel storage tank and comprises a radial lip defining an opening at its open end, and a system having a plurality of such form-coded collar assemblies. The collar assembly has a base plate with a hollow center comprising a greater footprint than the filling pipe; a form-coded collar that corresponds to a substance contained within the underground storage tank; and a sidewall extending between a user-facing surfaces of said base plate and said form-coded collar.

12 Claims, 5 Drawing Sheets

FORM-CODED UNDERGROUND STORAGE TANK FILLING PORT

FIELD OF THE INVENTION

The present invention pertains to a form-coded storage tank filling port, specifically for use with fuel storage tanks.

BACKGROUND OF THE INVENTION

Gas stations around the world utilize a standard underground fuel storage tank for storing petroleum and diesel fuel delivered to the gas station. A typical gas station includes at least 4 underground tanks connected to fueling stations, respectively containing diesel and grades 87, 89, and 91 petroleum. Operators of delivery trucks regularly replenish the fuel supply at a given gas station, sometimes multiple times a day.

Currently, a standardized filling port is utilized for various grades of petroleum and diesel, which are indistinguishable from each other. It can prove difficult to distinguish between the fuel grade or type contained by a given fuel tank, as the appearance of these tank filling ports are uniform. Attempts have been made to distinguish between the tanks by using paint to mark the openings corresponding to a respective grade of fuel. Red universally corresponds to grade 87 fuel, white corresponds to grade 89 fuel, and blue corresponds to grade 91 fuel. Diesel fuel is usually denoted by green color.

However, due to the frequent filling of these tanks, the paint often fades quickly, negating the distinguishing colors on the tank openings. Fuel spills may accelerate fading of the color, be it by being a potent solvent for a number of paints or by having a tendency of attracting dirt obscuring the color. Individuals filling the tanks must therefore rely on knowledge of the gas station layout to fill the correct tank, since no external distinguishing marks exist. Especially in gas stations situated in urban settings offering limited space, the filling ports for several underground fuel storage tanks are clustered so that their corresponding filling ports are placed proximal to each other, increasing the likelihood of filling a tank with the wrong substance. It is not uncommon for the operators of fuel delivery trucks to replenish a tank with the incorrect fuel type, which may cause damage to a vehicle or make it temporarily non-operational until the incorrect fuel in the tank is replaced, for instance petroleum fueled vehicle filled erroneously with diesel or a diesel fueled vehicle being filled erroneously with petroleum. Filling a petroleum fueled vehicle with diesel results in fuel injectors injecting diesel fuel into the engine's cylinders, but since diesel fuel does not evaporate as readily as petroleum, a vehicle's engine would not start. There is also a risk of damage occurring to the catalytic converter. Even if no permanent damage exists, it can cost upwards of thousand dollars per car affected to mitigate the problems created, such as for example draining the tank and replacing any damaged parts. Likewise, adding petroleum to a diesel engine creates friction between parts and can cause damage to fuel lines and pumps, which can require costly engine repairs.

Consequently, discovering an incorrect filling of an underground gas station storage tank requires pumping out the wrong fuel (e.g. diesel) from the storage tank and filling it with the correct fuel (e.g. petroleum). This is a costly process, often doubled in cost since mix-ups generally occur between two fuel types between two underground storage containers and their respective filling pipes. This results in costs for lost product, the draining of tanks, and the disposal of the now unsellable mixed fuel grades or types. Additionally, this has an environmental impact because it results in waste of nonrenewable resources.

SUMMARY OF THE INVENTION

There currently exists a problem with gasoline delivery that incorrect grade or type of gasoline is delivered into the underground tanks storing the gasoline.

There therefore exists a need to aid workers filling underground fuel storage tanks to distinguish between diesel and the different grades of petroleum. This problem is particularly relevant for underground fuel storage tanks, as other types of underground tanks such as septic tanks, water tanks, and heat tanks do not require frequent manual filling of different types of substances.

It is therefore an object of the invention to reduce instances of incorrect type or grade of fuel being filled into underground fuel storage tanks.

According to a first aspect of the invention, a form-coded collar assembly is provided that is configured to be attached around a filling pipe extending into an underground fuel storage tank and comprising a radial lip defining an opening at its open end, said collar assembly comprising: a base plate with a hollow center comprising a greater footprint than the filling pipe; a form-coded collar that corresponds to a substance contained within the underground storage tank; and a sidewall extending between a user-facing surfaces of said base plate and said form-coded collar.

According to a second aspect of the invention, a system is provided, comprising a plurality of storage tank filling ports having a plurality of filling pipes extending into an underground fuel storage tank and comprising radial lips defining an opening at its open end, comprising: a plurality of form-coded collar assemblies configured to be attached around a filling pipe extending into an underground fuel storage tank and comprising a radial lip defining an opening at its open end, said collar assembly comprising: a base plate with a hollow center comprising a greater footprint than the filling pipe; a form-coded collar that corresponds to a substance contained within the underground storage tank; and a sidewall extending between a user-facing surfaces of said base plate and said form-coded collar, wherein the system includes at least two of which having form-coded collars that differ in shape with respect to each other, wherein each one of form-coded collar of different shapes corresponds to a different grade or type of fuel.

The storage tank filling port could further comprise angular reinforcing elements 16 fixedly connected to the base plate 14 and the outside of the at least one sidewall 8. The filling port can additionally include a spill bucket 24 encompassing the filling port 1. This spill bucket could comprise at least one pressure release lid connecting the underground fuel storage tank 4 with the inside of the spill bucket 24.

According to a second aspect of the invention, a system of form-coded filling ports is provided, comprising: form-coded filling ports according to the first aspect of the invention, further including at least two varyingly shaped form-coded collars 10; wherein each form-coded collar 10 corresponds to a different grade or type of fuel. In a preferred embodiment, each form-coded collar 10 further comprises a respective distinguishing color. In yet another embodiment, filling ports 1 include at least one additional identifier other than form or color to distinguish tanks 4 containing petroleum from tanks 4 containing diesel. The additional identifier can be, for example, an engraving, a texture, or a material.

In a preferred embodiment, the form-coded collar also includes color-coding to further distinguish between the various filling ports. For instance, 87 would be read, 89 would be white, and 91 would be blue. Meanwhile, diesel would be green. Color can be added to the form-coded collar according to any coloring method known in the art, for example anodization or chemical coloring of metals such as electroplating or patination.

The material used for the filling port apparatus can likewise be chosen by a person skilled in the art. Particularly advantageous are corrosion resistant materials. For example, galvanized steel is commonly used for underground pipes.

In another preferred embodiment, multiple neighboring filling ports corresponding to neighboring underground storage tanks can comprise form-coded collars corresponding to the type or grade of fuel housed in the respective tank. Particularly in gas stations with limited space, such as gas stations situated in urban environments, tanks containing different types or grades of fuel are placed close to one another, increasing the likelihood of incorrect filling.

In some embodiments, the filling port can be attached to an existing underground storage tank. In other embodiments, the filling port is incorporated in the underground storage tank.

In a preferred embodiment, a spill bucket encompasses the filling port to catch and contain any possible leaks. A spill bucket can for example hold between 5-20 gallons of liquid.

Another problem is contamination of groundwater supply at the site of a gas station. When underwater storage tanks overfill, petroleum and diesel infiltrate the soil and possibly the groundwater in addition to the environmental harm created by such overflow, excavation of contaminated soil is costly. Therefore, there exists also a need in the art to prevent leakage and overflow when filling on underground storage tank.

The present invention includes holes at the base of the walls to help detect when a tank has reached its capacity. Additionally, the present invention employs sensors to alert operators of imminent overflow.

DETAILED DESCRIPTION OF THE DRAWINGS

Figure 1:
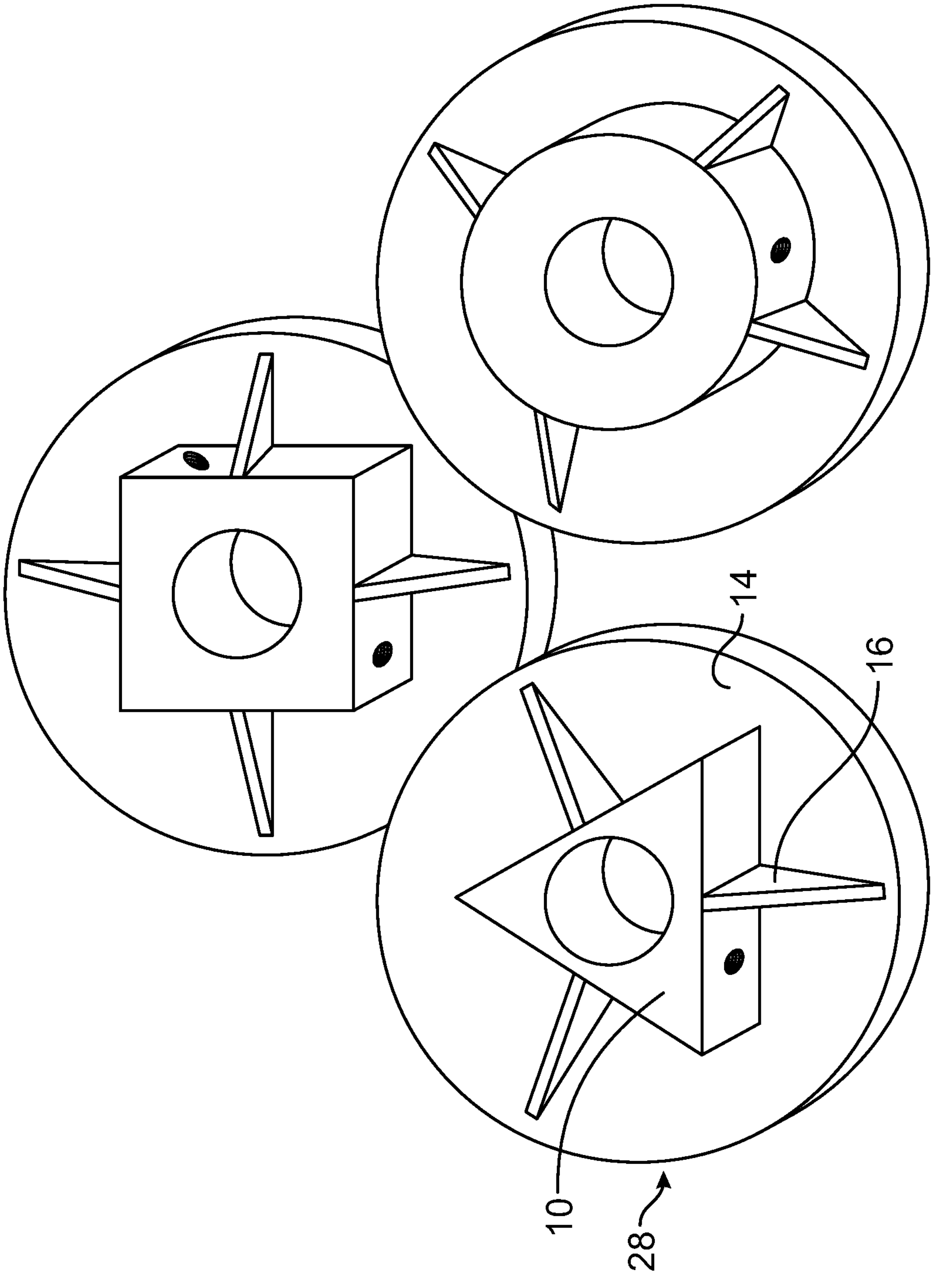
FIG. 1 shows a perspective view of different varieties of form-coded collar assemblies according to the invention.

As shown in the embodiment in FIG. 1, the invention includes a form-coded collar assembly 28 including a base plate 14, angular reinforcement elements 16, and at least one sidewall 8. The form-coded collar 10 can be formed in unique shapes to distinguish between the contents of a specific tank 4. Such shapes could for example be a circle, a triangle, a quadrilateral, a pentagon, or a hexagon. In the embodiment of claim 1, each shape could correspond to a different type or grade of fuel. In some embodiments, the form-coded collars 10 could additionally be color-coded to aid in distinguishing between filling ports 1. Additionally, the form-coded collars 10 could include an engraving to provide further indication of the correct tank 4 to fill.

In one embodiment, the collar assembly 28 can include two or more discrete segments which can be connected by fasteners or by other means to comprise the whole. The fasteners could for instance be inserted through the form-coded collars 10 on a plane perpendicular to the direction of the filling pipe 12, thus connecting the discrete segments without interfering with the operation of the filling port 1 One advantage of such a construction is the ease of installation on existing filling pipes 12, as a snug fit around the filling pipe 12 can simply be achieved.

Figure 2:
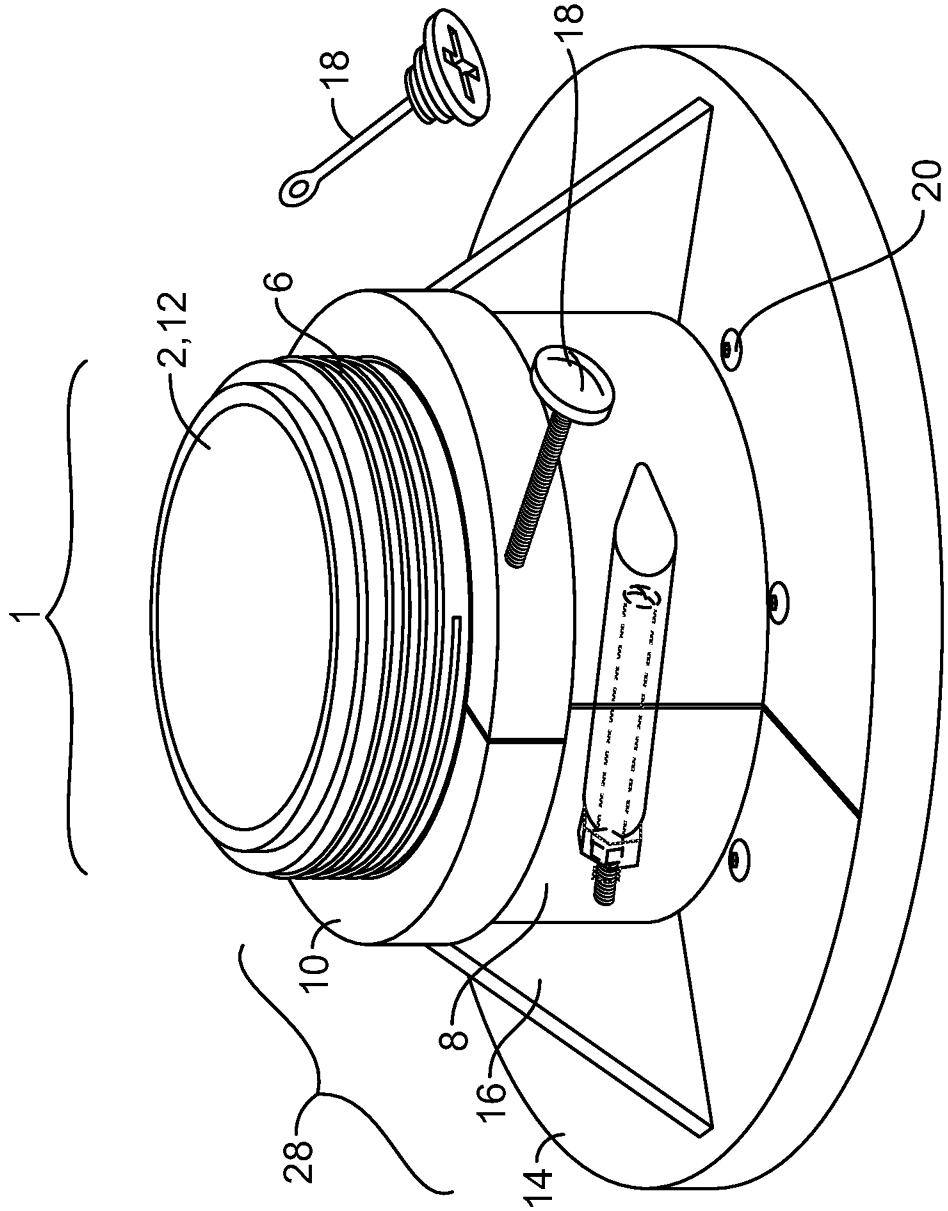
FIG. 2 shows a perspective view of an embodiment of an exemplary filling port with a circular collar and overflow prevention provisions.

FIG. 2 displays a close-up view of the filling port 1 according to a preferred embodiment of the present invention. At the top of the filling port 1 is an opening defined by the circumference of the filling pipe 12. Such a top includes a radial lip 6 extending from the opening to the form-coded collar 10 wrapped around the filling pipe 12. In this embodiment, the form-coded collar 10 has a circular shape. In other embodiments this could be any shape that helps to distinguish between underground storage tank contents. Further, the form-coded collar 10 can also be color-coded to provide further identification to an operator. Connected to form-coded collar 10 is a sidewall 8 extending downward to an intersecting base plate 14. One or more angular reinforcing elements 16 are disposed at the intersecting planes between the sidewall 8 and the base plate 14, extending radially outward a being attached to the sidewall 8 and the base plate 14, e.g. by welding or integrally formed therewith. In some embodiments, the sidewall 8 may be the sidewall of the filling pipe 12. Additionally, weep holes 20 may be disposed near the intersecting planes between the base plate 14 and the sidewalls 8 to alert an operator of imminent overflow of the tank, but also have the function of releasing spills into the spill bucket from which they can eventually drain back into the tank. Additionally, leak detection sensors in form of liquid sensors 18 may be placed in the sidewall 8 to provide an operator information on the fill level of the underground storage tank 4, generating further warning to possible overflow. These leak detection sensors may be design as a simple mechanical device like the one that is not shown inserted in FIG. 2, or as an electronic sensor capable of transmitting a signal like for instance a radiofrequency signal (RF), as demonstrated by the liquid sensor 18 shown screwed into the form-coded collar 10. In some embodiments, the liquid sensors 18 may be configured to trigger an alert or warning signal when a certain threshold has been reached.

Figure 3:
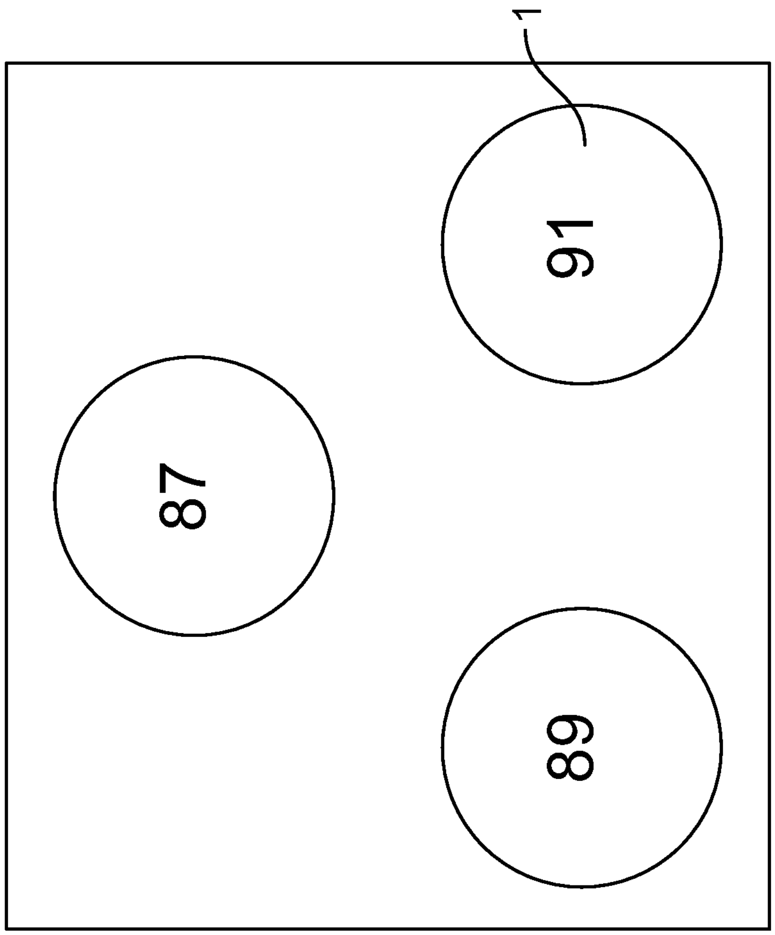
FIG. 3 shows a plan view of a schematic configuration of neighboring filling pipe outlets common in the art.

FIG. 3 shows what the filling ports 1 currently look like to the operators filling the fuel storage tanks 4. Currently, particularly at gas stations laid out on a smaller footprint of land, underground fuel storage tanks 4 and their corresponding filling ports 1 are located substantially proximate to each other. Additionally, no form-coding is employed to aid the operator in distinguishing between the contents of the tanks.

Figure 4:
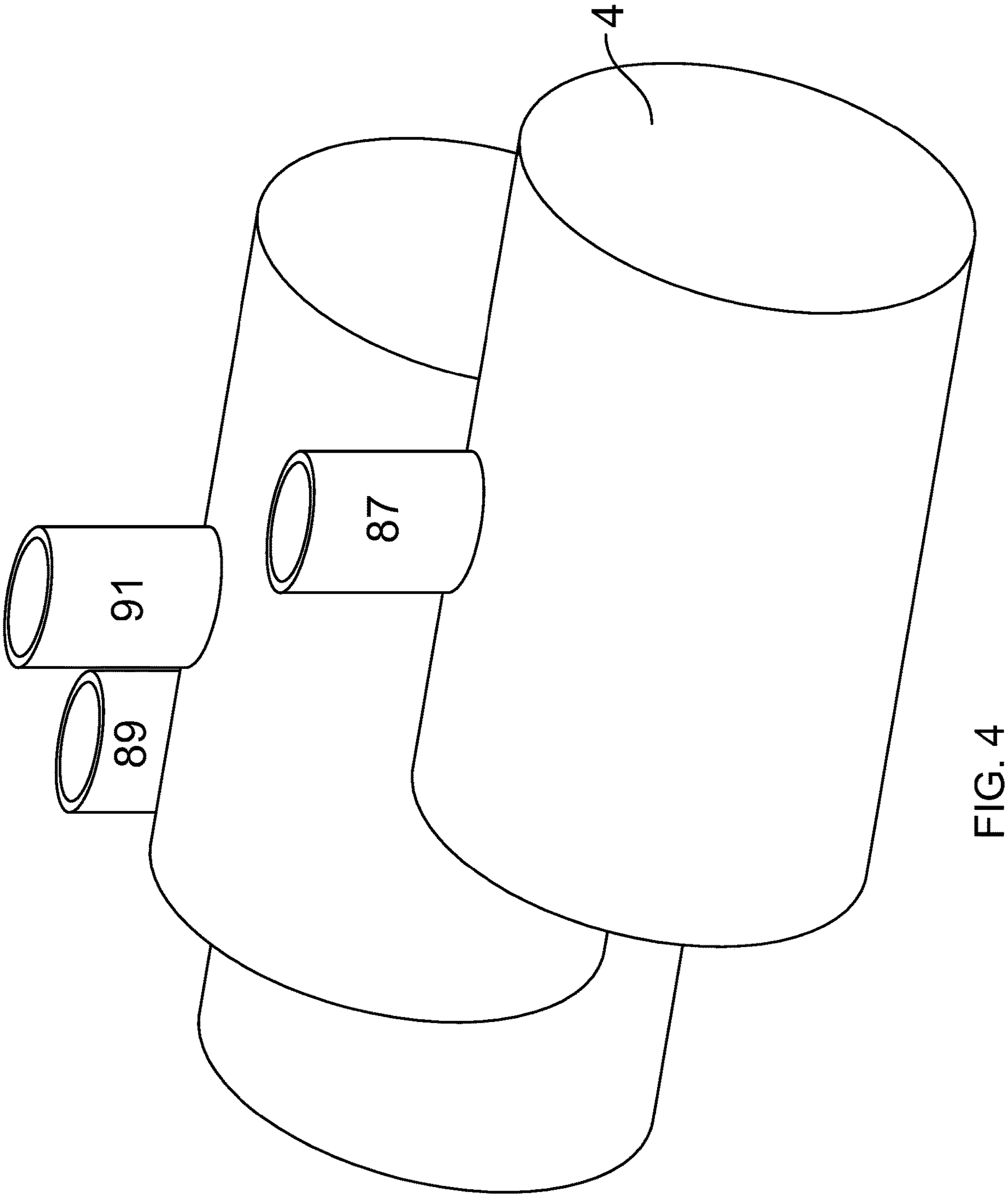
FIG. 4 shows a configuration of neighboring underground fuel storage tanks common in the art.

FIG. 4 shows the underground fuel storage tanks 4 corresponding to the filling ports 1 shown in FIG. 3. It is common practice for the fuel storage tanks 4 to be buried adjacent to each other as shown in FIG. 4. Additionally, the tanks corresponding to different grades or types of fuel are not always arranged in the same manner from one gas station to another.

Figure 5:
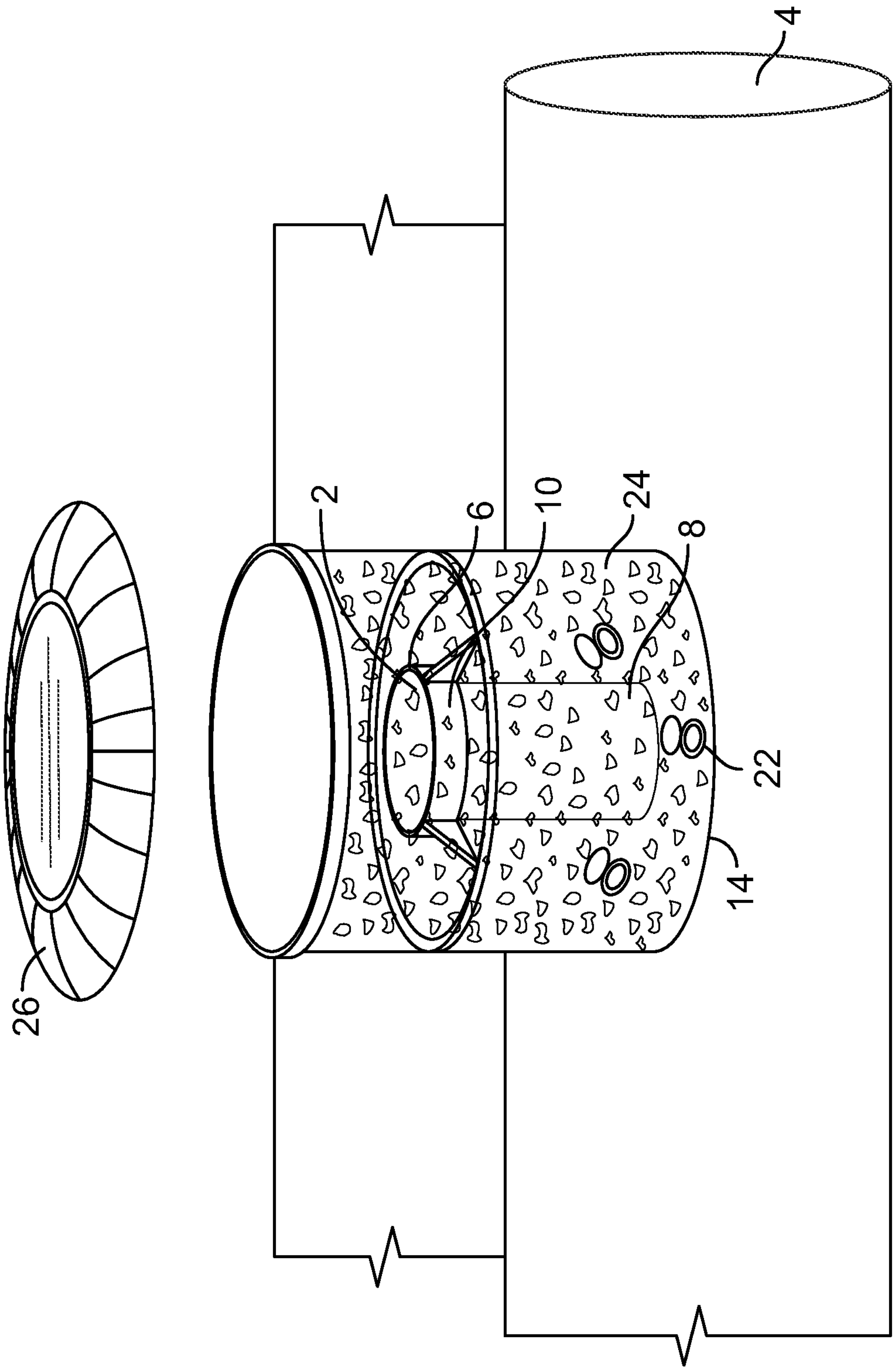
FIG. 5 shows a perspective view of the interior of a filling port according to the invention.

FIG. 5 shows an exemplary view of an underground fuel storage tank 4 with a spill bucket 24 including a filling port 1 according to the present invention. According to this embodiment, a fill pipe 12 extends into an underground fuel storage tank 4. A removable fill opening cover 26 level with the ground surface covers the filling port 1. A form-coded collar 10 surrounds the filling pipe 12 near the top of the pipe 12. A spill bucket 24, which extends into the underground fuel storage tank 4 encapsulates the entirety of the filling port 1. At the base of the spill bucket 24, pressure release lids 22 release pressure from the underground storage tank 4 and may open to release spilled fuel into the underground storage tank. The filling pipe 12 can for example comprise galvanized steel, which is particularly advantageous for its corrosion-resistant properties.

In one embodiment, the sidewall 8 includes dimensions defining an area that differs from both the form-coded collar 10 and the base plate 14. This sidewall 8 can for example be fixedly connected to the form-coded collar 10 and the base plate 14 or can be secured by other means such as by a fastener. In an alternate embodiment, the sidewall 8 can be defined by the form-coded collar 10, and accordingly can include identical dimensions and shape as the collar 10.

The examples used herein are intended merely to facilitate understanding of ways in which the invention may be practiced into further enable those of skill in the art to practice the embodiments of the invention. Accordingly, examples and embodiments herein should not be construed as limiting the scope of the invention, which is defined solely by the appended claims and applicable law. Moreover, it is noted that like reference numerals represent similar parts throughout the several views of the drawings, although not every Figure may repeat each and every feature that has been shown in another Figure in order to not obscure certain features or overwhelmed Figure with repetitive indicia. It is understood that the invention is not limited to the specific methodology, devices, apparatuses, materials, applications, etc., described herein, as these may vary. This also to be understood that the terminology used herein is used for the purpose of describing particular embodiments only, and is not intended to limit the scope of the invention.

REFERENCE NUMERALS

Filling port 1
Opening 2
Fuel storage tank 4
Radial lip 6
Sidewall 8
Form-coded collar 10
Filling Pipe 12
Base plate 14
Angular reinforcing element 16
Sensor 18
Weep holes 20
Pressure release lid 22
Spill bucket 24
Fill opening cover 26
Form-coded collar assembly 28

What is claimed is:

1. A form-coded collar assembly (28) configured to be attached around a filling pipe (12) extending into an underground fuel storage tank (4) and comprising a radial lip (6) defining an opening (2) at its open end, said collar assembly (28) comprising:

a base plate (14) with a hollow center comprising a greater footprint than the filling pipe (12);

a form-coded collar (10) that corresponds to a substance contained within the underground storage tank (4); and a sidewall (8) extending between a user-facing surfaces of said base plate (14) and said form-coded collar (10);

wherein the collar assembly (28) is formed for attachment around a filling pipe (12), without obstructing the radial lip (6) of said filling pipe (12).

2. The form-coded collar assembly (28) of claim 1, further comprising angular reinforcing elements (16) fixedly connected to the base plate (14) and the outside of the sidewall (8), wherein the sidewall extends substantially perpendicularly to and between said user-facing surfaces of said base plate (14) and said form-coded collar (10).

3. The form-coded collar assembly (28) of claim 1, further comprising leak detection sensors (18) insertable into the sidewall (8) to detect fill levels.

4. The form-coded collar assembly (28) of claim 1, wherein the base plate (14) includes at least one weep hole (20).

5. The form-coded collar assembly (28) of claim 1, wherein the form-coded collar assembly (28) comprises two segments configured to be connected by a fastener.

6. The form-coded collar assembly (28) of claim 1, wherein the sidewall (8) is the outer surface of the form-coded collar (10).

7. The form-coded collar assembly (28) of claim 1, wherein the sidewall (8) has differing dimensions from the form-coded collar (10) and the base plate (14).

8. A form-coding system configured for use with a plurality of storage tank filling ports (1) having a plurality of filling pipes (12) extending into an underground fuel storage tank (4) and comprising radial lips (6) defining an opening (2) at its open end, said system, comprising:

a plurality of form-coded collar assemblies (28), each form-coded collar assembly (28) comprising:

a base plate (14) with a hollow center comprising a greater footprint than the filling pipe (12);

a form-coded collar (10) that corresponds to a substance contained within the underground storage tank (4); and a sidewall (8) extending between a user-facing surfaces of said base plate (14) and said form-coded collar (10), wherein the collar assembly (28) is formed for attachment around a filling pipe (12), without obstructing the radial lip (6) of said filling pipe (12), wherein at least two of said form-coded collar assemblies (28) include form-coded collars (10) that differ in shape with respect to each other; and wherein each one of form-coded collar (10) of different shapes corresponds to a different grade or type of fuel.

9. The system according to claim 8, wherein each form-coded collar (10) further comprises a respective distinguishing color correlating to the respective form-coded collars.

10. The system according to claim 8, wherein filling ports (1) include at least one additional identifier other than form or color to distinguish tanks (4) containing petroleum from tanks (4) containing diesel.

11. The system of claim 8, further comprising a spill bucket (24) encompassing the storage tank filling port (1).

12. The system of claim 11, wherein the base of the spill bucket comprises at least one pressure release lid (22) connecting the underground fuel storage tank (4) with the inside of the spill bucket (24).

* * * * *